United States Patent
Lindup (10) Patent No.: US 11,588,330 B2
(45) Date of Patent: Feb. 21, 2023

(54) AGGREGATING ENERGY RESOURCES

(71) Applicant: A.T. KEARNEY LIMITED, London (GB)

(72) Inventor: John Lindup, London (GB)

(73) Assignee: A.T. KEARNEY LIMITED, London (GB)

( * ) Notice: Subject to any disclaimer, the term of this patent is extended or adjusted under 35 U.S.C. 154(b) by 448 days.

(21) Appl. No.: 16/632,981

(22) PCT Filed: Jul. 24, 2018

(86) PCT No.: PCT/EP2018/070050
§ 371 (c)(1),
(2) Date: Jan. 22, 2020

(87) PCT Pub. No.: WO2019/020632
PCT Pub. Date: Jan. 31, 2019

(65) Prior Publication Data
US 2020/0156495 A1    May 21, 2020

(30) Foreign Application Priority Data

Jul. 24, 2017    (GB) .................................. 1711845
Mar. 19, 2018    (GB) .................................. 1804328

(51) Int. Cl.
*H02J 3/00*    (2006.01)
*B60L 55/00*    (2019.01)
(Continued)

(52) U.S. Cl.
CPC .............. *H02J 3/008* (2013.01); *B60L 53/62* (2019.02); *B60L 53/665* (2019.02); *B60L 55/00* (2019.02);
(Continued)

(58) Field of Classification Search
CPC .......... B60L 53/62; B60L 55/00; B60L 58/16; B60L 53/665; H02J 13/00006;
(Continued)

(56) References Cited

U.S. PATENT DOCUMENTS 8,116,915 B2    2/2012    Kempton
8,588,991 B1 *    11/2013    Forbes, Jr. ........... G05B 19/042
                                                                    700/297
(Continued)

FOREIGN PATENT DOCUMENTS

CN    112186809 A *    1/2021
CN    110341537 B *    3/2021    .............. B60L 53/64
(Continued)

OTHER PUBLICATIONS

Search Report in GB Application No. 1804328.1, dated Nov. 14, 2018, 5pp.
(Continued)

*Primary Examiner* — Suresh Memula
(74) *Attorney, Agent, or Firm* — Hauptman Ham, LLP (57) ABSTRACT

A method for controlling an energy terminal, comprises determining a metric indicating a future availability of an energy resource at an energy terminal based on usage data associated to use of the energy resource by the energy terminal, generating control data to control the distribution of the energy resource between the energy terminal and an energy infrastructure based on the metric, and communicating the control data to the energy terminal.

18 Claims, 6 Drawing Sheets

(51) Int. Cl.

| | |
|---|---|
| *B60L 53/62* | (2019.01) |
| *B60L 58/16* | (2019.01) |
| *B60L 53/66* | (2019.01) |
| *H02J 13/00* | (2006.01) |
| *G05B 13/04* | (2006.01) |
| *H02J 3/32* | (2006.01) |
| *H02J 7/00* | (2006.01) |
| *B60K 6/28* | (2007.10) |

(52) U.S. Cl.
CPC ............ *B60L 58/16* (2019.02); *G05B 13/042* (2013.01); *H02J 3/00* (2013.01); *H02J 3/004* (2020.01); *H02J 3/322* (2020.01); *H02J 7/0013* (2013.01); *H02J 13/00002* (2020.01); *H02J 13/00006* (2020.01); *B60K 6/28* (2013.01); *B60Y 2200/91* (2013.01); *B60Y 2200/92* (2013.01); *B60Y 2300/91* (2013.01); *H02J 7/00034* (2020.01); *H02J 7/007188* (2020.01); *H02J 2203/20* (2020.01); *H02J 2310/46* (2020.01); *H02J 2310/64* (2020.01)

(58) Field of Classification Search
CPC .......... H02J 3/004; H02J 3/008; H02J 7/0047; H02J 2203/20; H02J 2310/64; G05B 13/042; B60K 6/28; B60Y 2200/91; B60Y 2200/92; B60Y 2300/91
USPC ........................................................ 700/291
See application file for complete search history.

(56) References Cited

U.S. PATENT DOCUMENTS

| | | | | |
|---|---|---|---|---|
| 8,706,650 | B2 * | 4/2014 | Ozog | H02J 3/14 |
| | | | | 705/400 |
| 10,833,504 | B2 * | 11/2020 | Forbes, Jr. | G06Q 10/00 |
| 11,007,891 | B1 * | 5/2021 | Kamal | H02J 3/322 |
| 11,270,243 | B1 * | 3/2022 | Roy | B60L 53/60 |
| 11,307,602 | B2 * | 4/2022 | Forbes, Jr. | G06Q 50/06 |
| 2007/0282495 | A1 * | 12/2007 | Kempton | B60L 53/11 |
| | | | | 701/22 |
| 2009/0066287 | A1 | 3/2009 | Pollack et al. | |
| 2009/0313103 | A1 * | 12/2009 | Ambrosio | G07F 15/003 |
| | | | | 705/14.34 |
| 2010/0179704 | A1 * | 7/2010 | Ozog | G06Q 30/0283 |
| | | | | 703/2 |
| 2011/0015799 | A1 | 1/2011 | Pollack et al. | |
| 2011/0202192 | A1 | 8/2011 | Kempton | |
| 2011/0276194 | A1 | 11/2011 | Emalfarb et al. | |
| 2013/0024035 | A1 | 1/2013 | Ito et al. | |
| 2013/0179061 | A1 | 7/2013 | Gadh et al. | |
| 2013/0211988 | A1 | 8/2013 | Dorn et al. | |
| 2013/0218355 | A1 * | 8/2013 | Lazaris | H02J 13/00002 |
| | | | | 706/15 |
| 2013/0289772 | A1 * | 10/2013 | Friedrich | H02J 3/04 |
| | | | | 700/291 |
| 2014/0018969 | A1 * | 1/2014 | Forbes, Jr. | H02J 3/386 |
| | | | | 700/295 |
| 2014/0277788 | A1 * | 9/2014 | Forbes, Jr. | G05B 15/02 |
| | | | | 700/286 |
| 2014/0304025 | A1 * | 10/2014 | Steven | H02J 13/00034 |
| | | | | 705/7.24 |
| 2015/0127178 | A1 * | 5/2015 | Forbes, Jr. | H02J 13/00034 |
| | | | | 700/286 |
| 2016/0075247 | A1 | 3/2016 | Uyeki | |
| 2016/0077507 | A1 * | 3/2016 | Sheble | G06Q 10/06 |
| | | | | 700/295 |
| 2016/0117657 | A1 * | 4/2016 | Forbes, Jr | H02J 13/00028 |
| | | | | 705/7.31 |
| 2016/0140449 | A1 * | 5/2016 | Ansari | G06N 7/02 |
| | | | | 706/52 |
| 2016/0280089 | A1 * | 9/2016 | Uyeki | B60L 53/67 |
| 2017/0025893 | A1 * | 1/2017 | Forbes, Jr. | G05B 13/02 |
| 2017/0083989 | A1 * | 3/2017 | Brockman | G06Q 50/06 |
| 2017/0092055 | A1 * | 3/2017 | Brockman | G06F 16/5866 |
| 2019/0036340 | A1 * | 1/2019 | Meeker | H02J 3/38 |
| 2019/0312440 | A1 * | 10/2019 | Pignier | H02J 3/14 |
| 2021/0276447 | A1 * | 9/2021 | Kumar | B60L 53/64 |
| 2021/0304306 | A1 * | 9/2021 | Sun | H02J 3/008 |
| 2021/0331603 | A1 * | 10/2021 | Brombach | B60L 53/66 |

FOREIGN PATENT DOCUMENTS

| | | | | |
|---|---|---|---|---|
| CN | 113991661 | A * | 1/2022 | |
| CN | 114039372 | A * | 2/2022 | |
| EP | 2056420 | A1 | 5/2009 | |
| EP | 2505421 | A2 * | 10/2012 | .......... B60L 11/1846 |
| EP | 2708403 | A2 | 3/2014 | |
| GB | 2505929 | A | 3/2014 | |
| GB | 2597342 | A * | 1/2022 | ............ B60L 53/665 |
| GB | 2598495 | A * | 3/2022 | ............ B60L 53/665 |
| KR | 20210148759 | A * | 12/2011 | |
| WO | 2011102855 | A1 | 8/2011 | |
| WO | 2011102856 | A1 | 8/2011 | |
| WO | 2011102857 | A1 | 8/2011 | |
| WO | WO-2014018504 | A2 * | 1/2014 | ............ G06Q 10/06 |
| WO | 2019020632 | A1 | 1/2019 | |
| WO | WO-2019126806 | A1 * | 6/2019 | ............. B60L 53/63 |
| WO | WO-2019243524 | A1 * | 12/2019 | ............ B60L 53/665 |
| WO | WO-2020160427 | A1 * | 8/2020 | |

OTHER PUBLICATIONS

Search Report in GB Application No. 1812043.6, dated Dec. 27, 2018, 6pp.

International Search Report and Written Opinion in International Application No. PCT/EP2018/070050, dated Oct. 24, 2018, 12pp.

Examination Report issued in corresponding GB Application No. 1914508.5, dated Oct. 9, 2020, 2 pgs.

* cited by examiner

AGGREGATING ENERGY RESOURCES

RELATED APPLICATIONS

The present application is a National Phase of international Application Number PCT/EP2018/070050 filed on Jul. 24, 2018 and claims priority to Great Britain application Number 1804328.1 filed on Mar. 19, 2018 and Great Britain application number 1711845.6 filed on July 24, 2017.

BACKGROUND

The number of Electric Vehicles (EVs)—including all asset classes e.g. busses, commercial fleets, domestic vehicles, autonomous vehicles and lorry freight transportation—is significantly rising across the globe, with little sign of slowing. In addition, use of distributed energy and microgeneration sources (such as solar pv, in-home battery storage etc.) is also increasing.

SUMMARY

According to an example, there is provided a method for controlling an energy terminal, comprising: determining a metric indicating a future availability of an energy resource at an energy terminal based on usage data associated to use of the energy resource by the energy terminal; generating control data to control the distribution of the energy resource between the energy terminal and an energy infrastructure based on the metric; and communicating the control data to the energy terminal.

The method may comprise: comparing the usage data to one more threshold values associated to the energy resource; and determining the metric of future availability on the basis of the comparison with the threshold value.

The threshold value may be a threshold for participation in an energy trading and/or balancing mechanism.

Determining the metric of future availability may comprise determining a probability of a likelihood that the energy terminal is connected to the charging infrastructure to enable redistribution of the energy resource.

The usage data may comprise one or more of geolocation data, availability data, data associated to one or more users of the energy terminal, charging performance data, personal activity data from a user device and/or the energy terminal and metering data.

Determining the metric of future availability of the energy terminal may comprise: receiving geolocation data from a user device associated with a user of an energy terminal; determining, based on the geolocation data, a distance of the user from the energy terminal; determining a time period of availability of the energy terminal based on the distance of the user from the energy terminal.

The control data may comprise data specifying one or more of an amount of and/or time period the energy resource is re-distributed to or from the charging infrastructure; and/or a time period when the energy terminal does not re-distribute the energy resource to or from the energy infrastructure.

The method may comprise: updating the metric based on the further usage data associated to use of the energy resource by the energy terminal; regenerating the control data based on the updated metric; and communicating the control data to the energy terminal.

The method may comprise: receiving an instruction to enable or prevent the energy terminal from distributing the energy resource between the energy terminal and the energy infrastructure; and generating the control data on the basis of the instruction.

The method may comprise receiving usage data from one or more devices associated to a user of the energy terminal.

The method may comprise: polling the one or more devices for usage data associated to the usage of the energy resource by the energy terminal.

The energy infrastructure may comprise a power transmission network. For example, the National Grid is the high-voltage electric power transmission network in Great Britain, connecting power stations and major substations and ensuring that electricity generated anywhere in England, Scotland and Wales can be used to satisfy demand elsewhere.

The energy infrastructure may comprise, for example, a charging infrastructure; for example, a charging point. Control may be exercised to transfer energy to/from the energy resource. Energy from the resource may, for example, be stored directly at a charging/discharging terminal, and/or may flow through to the wider power transmission network.

According to an example, there is provided a method of controlling an energy terminal comprising communicating data indicative of the usage of the energy resource by an energy terminal; receiving control data to control the distribution of the energy resource between the energy terminal and a charging infrastructure; and distributing the energy resource according to the control data, wherein the control data is determined on the basis of the future availability of the energy resource at the energy terminal based on the data indicative of the usage of the energy resource by the energy terminal.

In an example, the method can further comprise generating a measure of battery degradation by determining an initial state of charge of a battery, and refining the initial state of charge by weighting the initial state of charge against a battery degradation model.

According to an example, there is provided a computer program product, comprising a computer usable medium having computer readable program code embodied therein, said computer readable program code adapted to be executed to implement a method as claimed in any preceding claim.

According to an example, there is provided an apparatus comprising: data aggregator arranged to: receive usage data associated to an energy resource by one or more energy terminals; and determine a metric indicating a future availability of an energy resource at the plurality of energy terminals; and a data controller arranged to: generate control data to control the distribution of the energy resource between the plurality of energy terminals and a charging infrastructure based on the metric communicate the control data to the plurality of energy terminals.

According to an example, there is provided a method for aggregating an energy resource, comprising: monitoring a distributed energy resource comprising a plurality of remote energy terminals having a charge/supply of the energy resource; determining a confidence index in relation to availability of the remote energy terminals; and on the basis of the determined confidence index, redistributing/discharging the energy resource from one or more remote energy terminals to a national grid/central energy store. In some embodiments the energy resource is electricity.

The remote energy terminals may be one or more of: rechargeable batteries on hybrid/electric vehicles; solar panels; and heat pumps.

The method may further comprise referencing a database of consumer behaviour profiles, each profile relating to consumer use of the energy resource at the remote energy terminal.

The method may further comprise validating a set of redistribution requirements of consumer preferences prior to redistributing the energy resource.

The method may further comprise requesting permission from a consumer of the remote energy terminal and/or referencing consumer-determined preferences prior to redistributing/discharging the energy resource.

Determining the confidence index may comprise referencing a reliability of activity index from which a statistical probability is derived that the remote energy terminal will be available at a specific time or for a set period of time.

Determining the confidence index may comprise use of geolocation data indicating a proximity of the consumer to the remote energy terminal.

Determining the confidence index may comprise referencing a consumer reliability profile prior to the redistribution of the energy resource.

Determining the confidence index may comprise referencing charging performance data in relation to a charging and/or discharging factor of the remote energy terminal.

Determining the confidence index may comprise collection and/or integration of personal activity data from a consumer of the remote energy terminal.

Determining the confidence index may comprises use of metering data relating to a metering factor of the energy resource at the remove energy terminals.

The energy resource from one or more remote energy terminals to the grid/store may be redistributed according to a usage of the energy resource from the grid/store.

The energy resource may be distributed from the grid/store back to the consumer according to a cost optimisation/charging infrastructure.

A further aspect provides a method for aggregating a distributed energy resource, comprising: monitoring a distributed energy resource comprising a plurality of remote energy terminals having a charge/supply of the energy resource; determining a reliability of activity index in relation to availability of the remote energy terminals; and on the basis of the determined index, redistributing/discharging the energy resource from one or more remote energy terminals to a national grid/central energy store.

A further aspect provides a method of aggregating electrical load from a plurality of electric vehicles, comprising: determining a confidence index in relation to availability of at least some of the charge from the vehicles which collectively satisfies a demand level; and on the basis of the determined index, discharging from one or more of the vehicles.

A statistical behavioural profile of: (i) individuals' User Reliability Profiles; and (ii) a collective Reliability of Activity Index, may be accessed whereby to enable risk management practices necessary to participate in an energy trading and balancing mechanisms.

The method may comprise the step of predicting an amount of EVs available to charge and discharge across a range of User Reliability Profiles.

The User Reliability Profile may build up a statistical profile of each user, their habits and behaviours.

The method may comprise applying user tolerances to how an EV or group of EVs can be managed.

The user tolerances may include:
establishing and setting the base level of charge that is required by a certain time of day;
establishing a base level of charge that the users EV or the users EV fleet cannot drop below;
establishing a window of activity where the consumer will be away from their EV and authorizing its use as part of a charging scheme;
establishing the nature of charging based off the battery performance and maintenance indicators;
establishing feedback mechanisms to offer users the opportunity to participate in short term bidding opportunities;
provision of an option to participate in a short-term balancing mechanism opportunity to a range of participants with a specific User Reliability Profile;
establishing an interface where users can notify where there is a change of plan to their committed activities;
the system gives users the opportunity to cease participation in a specific trade ahead of time, preserving their User Reliability Profile or if the market permits, a Cash Out option;
an 'opt-in' model for the consumer meaning that they can accept an offer received on their smart phone in exchange for parking and connecting their vehicle to the grid at an appropriate charging point;
the scheduling of projected charging time slots to provide a forward view of projected charging availability.
on a regular basis, the user can confirm when they anticipate their EV or fleet of EVs will be available;
enabling the consumer to establish an optimal charging and discharging regimes.

A further aspect provides a computer program product, comprising a computer usable medium having computer readable program code embodied therein, said computer readable program code adapted to be executed to implement a method as claimed in any preceding claim.

According to an example, there is provided a system for aggregation of an energy resource stored in distributed terminals, for example electricity distributed across electric vehicles (EVs) or micro-generators. Charging and discharging of these terminals to a central energy store (such as a national grid) can be determined based on a confidence index and/or reliability of activity index. The index/es may relate to a statistical risk model based on multiple user profiles which take into account user behaviour, preferences and other data to predict whether the terminal will be available to provide charge.

In some embodiments risk modelling and indexes are used reliably to determine when a resource can be traded into an energy infrastructure.

Means of aggregating a resource, such as electricity, distributed across multiple user terminals, can be provided. A system may use an index which takes into account the likelihood of a terminal being available to supply the resource based on user behaviour, preferences and reliability in order to determine when the terminal can be discharged. This allows a big data platform to be used to provide statistical models in determining when resource will be available. The resource can be traded with suitable risk management available to an aggregator; this may help manage resource demand spikes.

According to an example, there is provided a system for resource aggregation.

The system may be implemented by means of a programme, which calculates user profile indexes and aggregates them to arrive at a confidence index.

Energy stored in EVs may be traded without exposing the trader to unacceptable risk in being liable if a user disconnects.

Different aspects and embodiments as described herein may be used separately or together.

BRIEF DESCRIPTION OF THE DRAWINGS

Embodiments will now be described, by way of example only, with reference to the accompanying drawings, in which.

DESCRIPTION

The following example embodiments are described in sufficient detail to enable those of ordinary skill in the art to embody and implement the systems and processes herein described. It is important to understand that embodiments can be provided in many alternative forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

According to examples, EVs can be systematically discharged or charged at designated times between journeys to smooth capacity spikes across transmission and distribution networks. To incentivise the smoothing of spikes in electricity grids, there are a range of mechanisms that benefit a range of generation and storage providers by being able to help service the smoothing of spikes. This sits alongside energy trading practices which are also broadly aligned to the existence of capacity spikes in most markets. These energy trading and balancing mechanisms are different across each market.

The owner or operator of EVs (in particular) and micro-generation owners can therefore benefit from accessing these mechanisms, by allowing and/or enabling their charging and discharging to be adapted to participate in energy balancing and trading mechanisms.

If consumers can commit to participating while their vehicle is connected to an EV (or equivalent for other asset classes) charging infrastructure, their collective loads can be harnessed to participate across these balancing and trading mechanisms i.e. by adapting the charging and discharging profiles across a number of EVs, the group can participate in a range of financial incentives to provide a financial benefit for adapting their charging or discharging behaviours. In an example, the ability to access these markets will typically (but not exclusively) be carried out by an "aggregator".

In some aspects charging behaviours of EVs can be leveraged to capitalise on these market opportunities across both business-to-business (B2B) and business-to-consumer (B2C) sectors.

In order for consumers or groups of consumers to access the variety of trading and balancing mechanisms on offer, the approach to participating must be practical and in line with the usage requirements of users. At both a B2B and B2C level, it is necessary to have a scheme that enables the user of a vehicle, for example, to disconnect it and accommodate the risk that this adds to the aggregated load across multiple users.

For example, the below are cases of when an EV that was previously committed to charging or discharging may need to suddenly change behaviour: B2C—in the case of an emergency or a change of plans; B2B—when the value of disconnecting charging is higher that the trading benefit, when the individual EV load combined with their corporate energy strategy and penalties.

This presents a challenge for the aggregator of these energy loads, who is supporting these consumers in accessing the trading or balancing mechanisms. In a majority of markets, this aggregator must commit to the merchant trade on a trading or market mechanism or be liable for defaulting.

In examples, a big data platform can be used to enable B2B and B2C (or mixed groups of consumers) to access the variety of energy trading and balancing mechanisms on offer for adapting their charging and discharging practices of their EVs and micro-generation sources.

The big data platform enables the necessary intelligence and algorithms to inform statistical risk modelling required to exploit electricity loads across energy trading and balancing mechanisms.

The platform may have a range of capabilities:

When accessing energy trading and balancing mechanisms, there will be a requirement for the aggregator to take financial positions which invariably come with a financial risk should they not be able to fulfil an obligation that has been committed to. That is, the aggregator commits to an energy trade, then a large number of participants disconnect their EVs, leaving the aggregator unable to fulfil the trade and financially exposed or there is significantly less sunlight than projected, impacting solar PV generation, for example. The obligations and risk for an aggregator will vary across the different energy trading and balancing mechanisms across the world. The big data platform approach involves the creation of a risk management tool that can be used to manage financial risk of exploiting these differing energy markets (on a global scale) through energy trading and balancing mechanisms.

At both a B2B and B2C level, it is necessary to have a capability to accommodate the possibility that the user may disconnect their EV for a range of reasons from emergency to convenience, or a range of other influences impact the projected load levels required to access balancing and trading mechanisms. Therefore, analytics are paramount in gaining a statistical behavioural profile of both individuals (i) User Reliability Profile) and the collective (ii) Reliability of Activity Index that enables the risk management practices necessary to participate in these energy trading and balancing mechanisms.

In an example, a User Reliability Profile represents a statistical profile of each user, their habits and behaviours, for the purpose of enabling exploitation of energy trading and balancing mechanisms by adapting the charging and discharging of an EV or group of EVs. The User Reliability Profile can be applied to both B2C and B2B industries.

The User Reliability Profile can be applied to an individual EV, to an individual user, a household, a business and a Group of Users (both B2C and B2B) or any combination of the above.

The User Reliability Profile includes the application of historical EV and charging performance data that can be applied to understand the charging and discharging potential of different vehicle and micro-generation types and charging infrastructures. For example, the speed at which a charger being used can charge, the speed at which a charger and EV can discharge.

The User Reliability Profile includes machine learning and artificial intelligence (AI) capability to automate learning functions based on ever increasing combinations of opportunity for data correlation. E.g. the integration of data from user's calendars to indicate when they will be in a meeting or away on holiday.

The User Reliability Profile creates a historical pattern of usage behaviours per profile, which are central to informing statistical models on that profile's likely behaviour, which informs market exploitation through energy trading and balancing mechanisms.

According to an example, a User Reliability Profile can include data representing the geo-location of the user in relation their EV, home or generation source, whereby to inform exploitation of energy trading or balancing mechanisms. In an example, data can be collected from (not exhaustive)—IoT devices placed in the user's vehicles, from apps on the users smart their smartphones, from social media, calendars (or similar) for the purpose of using big data and analytical techniques to accurately connect to, monitor and analyse the reliability of user movement patterns. These movement patterns can be used to help generate a User Reliability Profile that provides a rating for each consumer that impacts the risk management practices.

For example, for a participating B2C user, they may be 2 miles away from their EV which is charging. There is an opportunity to take part in a balancing mechanism that that requires immediate electrical load to be accessed over a 15-minute period. Given the location of the user and their EV (2 miles away), combined with a range of historical habits (among other inputs), the statistical likelihood that the user will not disconnect during this window, given the distance away and time of travel it may take to reach their vehicle can be calculated.

In another example, a couple may both use their mobile phones as a location device, indicating that they are away from home for a period of two hours during a peak demand time. This information can be used to inform the statistical model to manage charging of an associated EV and also any associated micro-generation devices for example. That is, given intelligence about the location and movements of a user, the capacity of an EV can be modified, either by charging or discharging. In the latter case, the discharge to, for example, an electrical grid infrastructure can be used to smooth spikes in demand for power as described above, particularly if the movements of a user can be determined in advance with a degree of accuracy.

In an example, the geo-location of a user in relation to their EV or generation sources can be separated out from other components of the User Reliability Profile given its significance in determining statistical risk that informs exploitation methods in the energy trading and balancing mechanism markets.

In an example, real-time information can be collected from a user/vehicle such as (but not limited to): GPS coordinates, acceleration, charging/discharging operations, battery state of charge, user proximity to the car. From the raw set of data other data sets such as date and time spent traveling vs staying home or at the office, time spent at a particular location, driving cycles (urban, highway, . . . ) can be calculated.

Using the data gathered from a user and/or vehicle for example, a user can be categorised. Categorization can be performed by matching user activity to a reference profile.

Figure 1A:
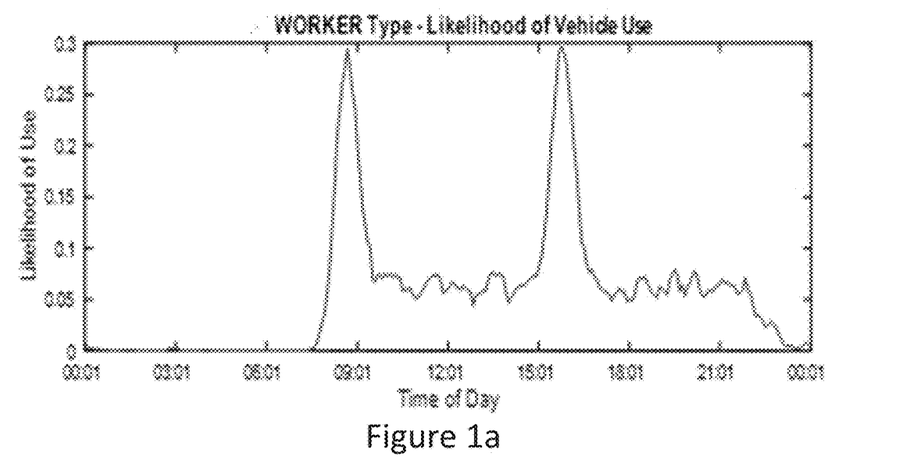
FIGS. 1a, 1b and 1c are schematic representations of user profiles according to an example.
Figure 1B:
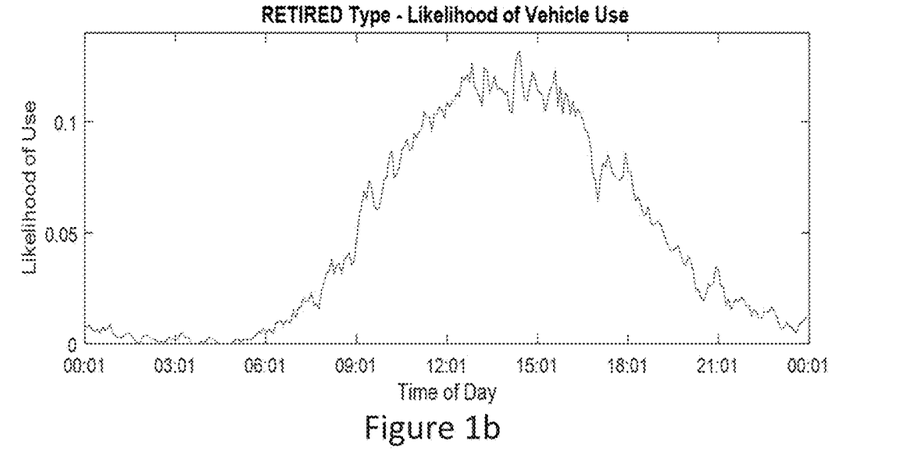
Figure 1C:
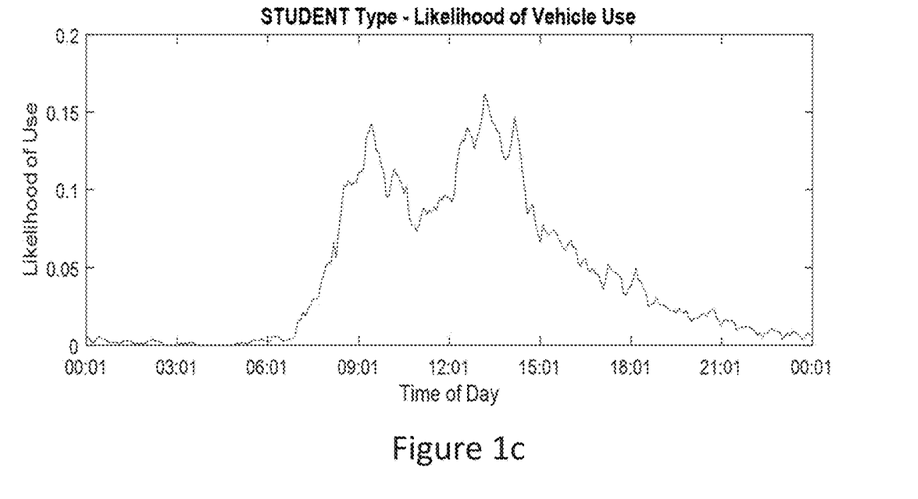

FIGS. 1a, 1b and 1c are schematic representations of user profiles according to an example. In an example, user profiles, such as those depicted, can be generated and refined using data collected over multiple users and/or vehicles, which data can be anonymised. For example, multiple users, who may categorise themselves as workers, can have their data aggregated in order to generate a related profile that gives an indication of the likelihood of use of a vehicle (with which the user may be associated—e.g. their own vehicle or a pool car and so on) at one or more of particular times, locations, days and so on. Similar considerations apply to other profiles for other demographics.

FIG. 1a shows a 'worker' profile according to an example. Such a profile is characterised by regular weekday patterns and a fixed regular destination. Accordingly, as can be seen, there are increased likelihoods of vehicle use at peak times, such as when the worker is traveling to and from a place of work for example.

In FIG. 1b, an exemplary 'retired' profile is depicted. This profile is characterised by no fixed patterns, no fixed destination and more non-regular journeys.

In FIG. 1c, an exemplary 'student' profile is depicted. This profile is characterised by part time weekday patterns, fixed regular destination and non-regular journeys.

Figure 2:
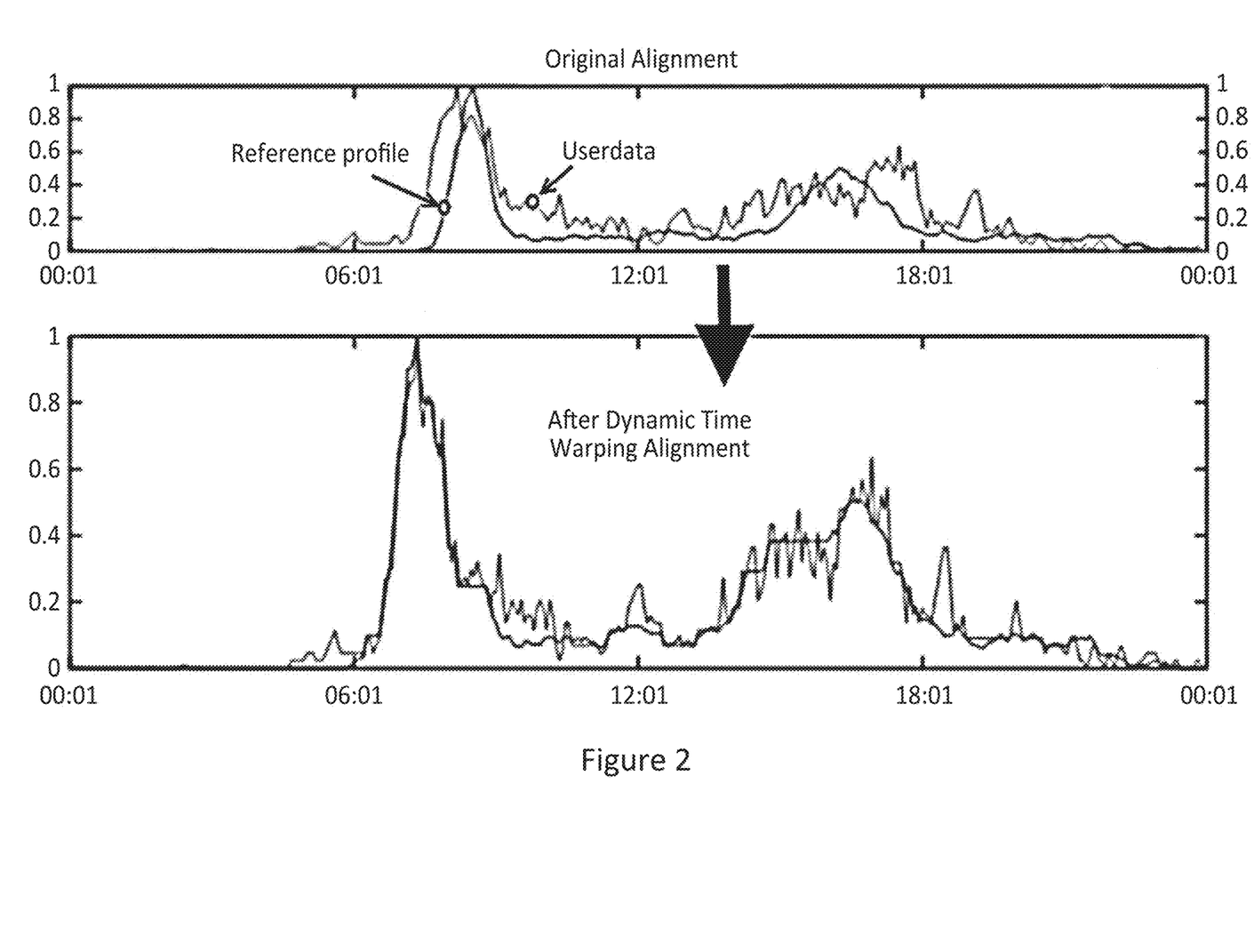
FIG. 2 is a schematic representation of a user profile according to an example.

FIG. 2 is a schematic representation of a user profile according to an example. In the example of FIG. 2 a generic (reference) profile for a worker is provided (such as that depicted in FIG. 1a for example). Real-time (user) data collected from a user, in the form of a dynamic profile, is compared to the reference profile in order to determine a match for the user. Determining a profile match for a user can then enable the user's EV usage to be leveraged as described above.

As data is collected in real-time, it may be the case that the user's dynamic profile does not match the reference profile. In an example, as depicted in FIG. 2, the dynamic profile can be modified in order to better align it with a reference profile. For example, as depicted in FIG. 2, the user's dynamic profile is time-shifted compared to the reference profile. For example, compared to the reference profile, this particular user may start a commute an hour earlier than that characterised by the reference profile.

In an example, a user (dynamic) profile can be translated and/or stretched with respect to a reference profile. As an example, if we are looking to match a profile to a "worker" reference profile, we may be looking at different start times, break times and end times than a standard 9 am-5 pm type of day. Thus, in an example, the data representing the user dynamic profile can be parsed in order to identify peak/off peak activities. For example, user activity that is above a predetermined threshold (or non-zero value) can indicate peak activity. For example, vehicle motion (as determined by a GPS value for example) and/or battery usage can be used to determine user activity.

This succession of on peaks/off peaks can be used to indicate one or several potential profiles of reference to be compared with. Identification of the correct (or a matching) reference profile can then be performed by aligning these peaks to the reference profile by, for example, iteration, performing a combination of translation and stretching to reach, for example, a >90% match. Thus, in an example, a dynamic profile (inasmuch as it is generated using real-time data) can be processed in order to determine a set of peak values within a predetermined range of the profile. With reference to FIG. 2 for example, a number of peak values between two time values of the profile can be determined. A peak value can be characterised as a likelihood of use above a predetermined threshold value, such as a value above 0.1 for example. Using, for example, two such peak values, a user profile can be mapped to a reference profile by translating and/or stretching the user profile to align peak values determined from the user profile to peak values of the reference profile for example. Once the peak values are aligned, it can be determined how well the user profile matches the rest of the reference profile. For example, if a value of the user profile is within a certain tolerance value of the corresponding value of the reference profile it can be considered a match. For example, a tolerance may be +/−10%.

By matching a user to a reference profile, it is possible to determine a future pattern of EV use by that user, which can inform a choice of strategy used for EV charge/discharge for example. So, for example, if a user is matched to a worker profile, it can therefore be deduced that the energy storage device of the user's EV may be utilised during certain periods of day without impacting the user. Accordingly, based on the profile, which may also take into account the location of the user relative to the EV, a charging device can be used to charge or discharge the EV depending on various parameters such as user preference, grid infrastructure need and so on.

In an example, a user preference and acceptance process and settings provide the ability for a user to apply tolerances to how their EV or group of EVs or micro generation can be managed (both B2C and B2C). These user preferences can be enabled through user interfaces that are supported as applications on phones, tablets and laptop PCs for example. In an example, this can include (but is not restricted to):

Establishing and setting the base level of charge that is required by a certain time of day. E.g. "I need 25% of charge by 1700 today for my journey home".

Establishing a base level of charge that the users EV or the users EV fleet cannot drop below. E.g. "I require my EV fleet to always be charged to above 40%, meaning that no exploitation of their energy load can occur until this point is reached".

Establishing a window of activity where the consumer will be away from their EV and authorizing its use as part of a charging scheme. E.g. "I will be away from my car for 2 hours".

Establishing the nature of charging based off the battery performance and maintenance indicators. Where a consumer (B2B or B2C) wants to ensure that any battery charging or discharging follows a specific approach in order to preserve battery performance. E.g. "I do not want rapid charging or discharging to be used for my EV". This example would limit the potential energy that can be provided by the EV owner.

Establishing feedback mechanisms to offer users the opportunity to participate in short term bidding opportunities. E.g. Provision of an option to participate in a short-term balancing mechanism opportunity to a range of participants with a specific User Reliability Profile via a user application on their phone. The system knows if they are charging and send an opportunity for their phone with the requirements and providing an opportunity to participate or decline.

Establishing an interface where users can notify where there is a change of plan to their committed activities; for example, where possible, the system gives users the opportunity to cease participation in a specific trade ahead of time, preserving their User Reliability Profile or if the market permits, a Cash Out option.

The definition and capture of consumer usage preferences which are used to define the simple interface at both a B2C and B2B level.

The ability to model and optimize charging and discharging patterns across multiple markets for the purposes of enabling statistically based assessments for the purposes of accessing energy trading and balancing mechanism markets.

An 'opt-in' model for the consumer meaning that they would accept an offer received on their smart phone in exchange for parking and connecting their vehicle to the grid at an appropriate charging point.

The scheduling of projected charging time slots to provide a forward view of projected charging availability. E.g. on a weekly basis, the user can confirm when they anticipate their EV or fleet of EVs will be available.

Enabling the consumer to establish an optimal charging and discharging regime. For example, there can be improvements in the welfare of batteries by adopting particular charging regimes, such as not allowing a battery to go below a certain amount of charge for example.

Through the big data platform, we can support the modelling of battery degradation levels that are unique to an EV, caused by the differing use profiles. As each user will have different driving habits and driving profiles, there will be variations in the level of degradation per battery. In some embodiments the platform integrates data from standardized specifications and degradation projections provided by the manufacturer and where possible open APIs from manufacturers, combined with additional usage information which provide additional performance indicators on the battery. Against these tolerances, battery performance and recommended charging behaviour settings are provided as a variable to help users tailor their preferred participation in any charging or discharging mechanisms.

According to an example, across a range of User Reliability Profiles, at any one time there will be a predicted number of EVs or micro generation available to charge and discharge. This predicted amount can be established through a consolidated view of the User Reliability Profiles (which include both predictions on availability in the future and in real-time). To leverage the aggregated potential across the EVs and micro-storage, a Reliability of Activity Index can be used to leverage the User Reliability Profiles to create a statistically informed projection, with risk spreads of actual available load, at different time periods over the course of a day. These Reliability of Activity Indexes can be tailored to appropriate market exploitation mechanisms and the risk tolerance preferences of the aggregator who is using them.

In an example, a reliability of Activity Index can be configured for any market or regulatory regime. E.g. under exactly the same user profile conditions, the projections and outputs of the Reliability of Activity Index may differ across the UK and North America due to the different market exploitation mechanisms in place for example.

A reliability of Activity Index can be configured to accommodate the different profiles for different market mechanisms. E.g. in some markets, negative generation is achieved by not charging at a certain time, and this can be modelled as well as mechanisms that support EVs and micro-generation providing excess power back to the grid.

A reliability of Activity Index can be provided to inform multiple business models. E.g. the Reliability of Activity Index can be given as a live feed to an energy trading house with aggregated EV and/or micro-generation load, alongside a forward projection tool.

Reliability of Activity Index can be continually refined and adapted to improve the statistical projections over time. It can also continually be enhanced by the addition of new data points and new markets as they emerge. E.g. the emergence of peer-to-peer trading of energy between EV and micro-generation users. A reliability of Activity Index can accommodate different trading mechanisms, including Blockchain for example.

According to an example, a state of charge (SoC) of a battery can be used as a parameter to determine a User Reliability Profile. The state of charge of a battery can be determined using a vehicle telemetry system (via a CAN bus for example) or via a charging point system when the EV is plugged in. In addition to an actual SoC reading, an estimated SoC can be calculated. In an example, a SoC calculation can use the Type of Battery being used and an associated theoretical battery degradation model: for example, when a vehicle is registered with a system as described herein, a statistical model providing estimated state of charge of the battery over time based on "usage" can be provided. The Battery degradation model is specific to a particular vehicle model and provides information on the dynamic state of the battery over time. An on-board studio can be provided to load or fine tune this model for a given car model.

Figure 3:
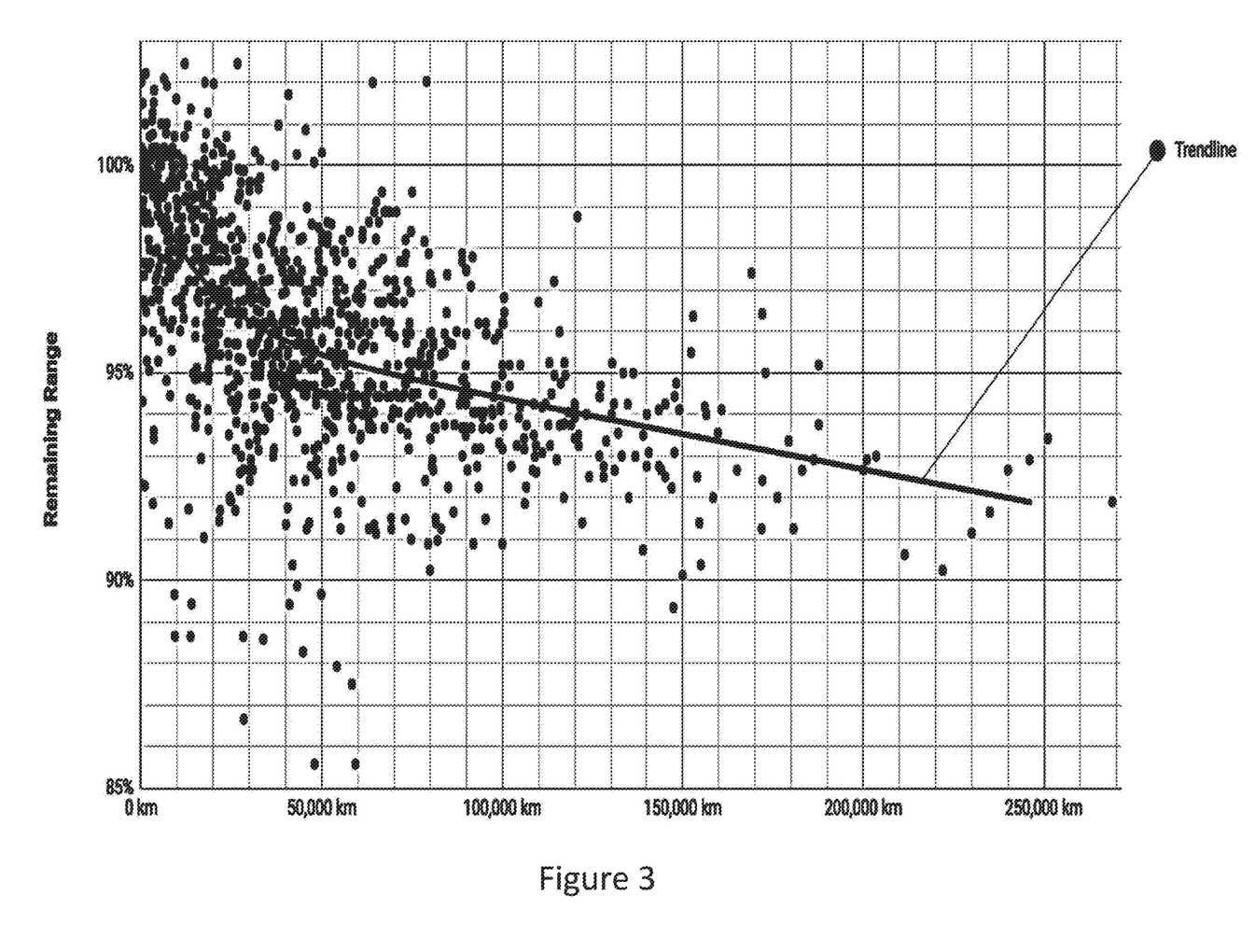
FIG. 3 is a schematic representation of a measure of battery health.

FIG. 3 is a schematic representation of a measure of battery health. More particularly, FIG. 3 depicts how the real capacity of a battery varies according to the range over which a vehicle, powered by the battery, travels. That is, since the number of charging cycles of a battery can be considered to be proportional to the distance (range) traveled the graph of FIG. 3 provides an indication of how a battery capacity can vary.

In an example, battery usage can be defined by the itinerary of the car (GPS coordinates and elevation for example), the driving cycle and the driving style. Accordingly, a battery degradation model according to an example provides a SoC based on its historical behaviour derived using actual past itinerary data. Over time, the platform can provide each EV with its own specific battery degradation model.

In an example, an initial state of charge model can be generated by converting usage into charge/discharge current over time (Ah) and using linear quadratic estimation (or Kalman filtering) for example to determine the estimated SoC of the battery. A refinement on the initial model can be performed in which the estimated SoC is weighted against a battery degradation model to correct the estimate based on other factors such as the age of the battery.

In an example, using reinforcement learning, a battery degradation model can be updated and refined over time. For example, the difference between the estimated SoC provided via the above calculation method and the actual SoC reading when the vehicle is plugged into a charging point or when the on-board car telemetry is available (OBD port for example) can be used to recalibrate the process. This makes the overall system more and more accurate for any particular vehicle over time.

The establishment of EV and micro-generation charging clubs—across a range of User Reliability Profiles from both B2B and B2C markets, we will provide the data and analytical services to support the formation and specification of different charging dubs whose specific preferences provide opportunities to enable new and differentiated EV and micro-generation charging dubs.

Where groups of EV and micro-generation owners agree to cooperate across a charging and discharging profile. These groups can range from small (3 EVs) to large (multiple 1000s).

Larger aggregated charging loads can potentially access different trading and balancing mechanism markets. E.g. the wholesale electricity trading market in the UK operates on a IMB tradeable unit capacity. Therefore, groups with different appetites for risk or who can commit to specific high value charging windows, will have the ability to participate. E.g. a consumer with the ability to regularly allow their EV (or group of EVs) to be charged or discharged during a high value period of time may want to form a high value and exclusive Charging Club. The present invention can enable the underlying data sources to support this formation.

In some embodiments these user groups can have different incentive schemes. E.g. Community Energy Charging. Where parents from a school all allow exploitation to take place, with profits being recycled back into their local school.

In some embodiments corporations can also participate in groups. E.g. businesses on a local campus can participate jointly to enhance their load under management and enable access to new trading or market mechanisms.

Figure 6:
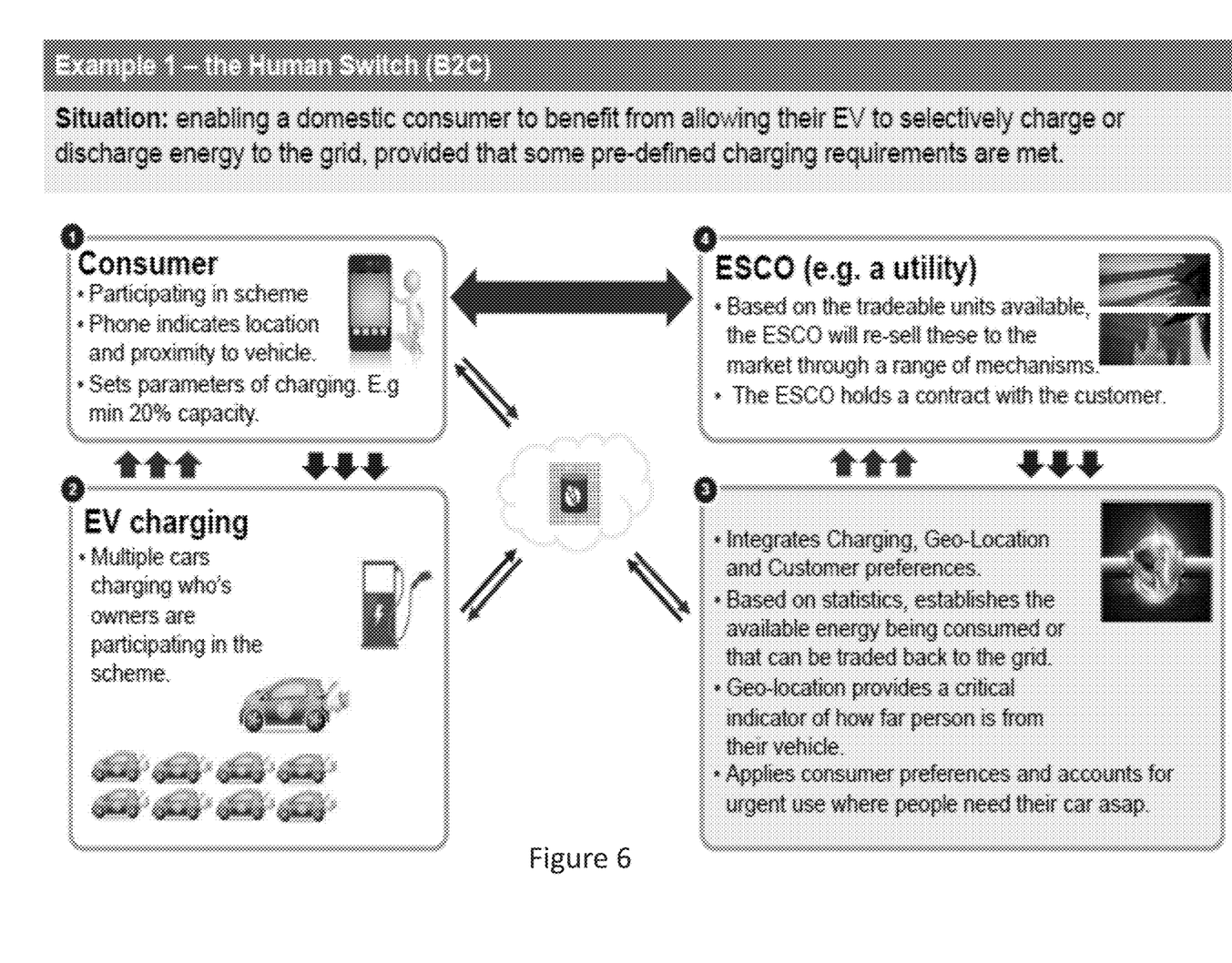
FIG. 6 is a schematic representation of a business-to-consumer use model according to an example.
Figure 7:
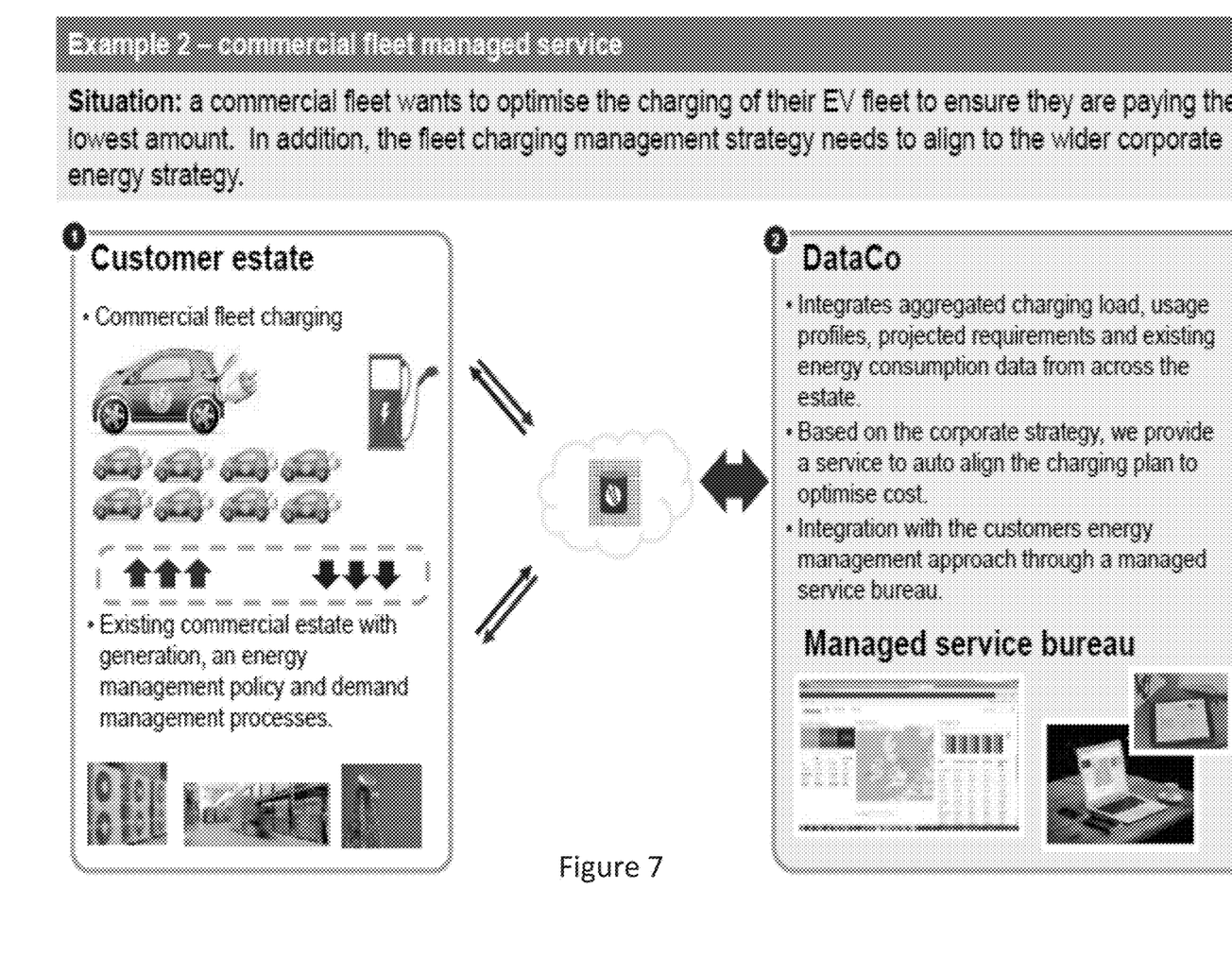
FIG. 7 is a schematic representation of a business-co-business use model according to an example.

FIG. 6 is a schematic representation of a business-to-consumer use model according to an example. FIG. 7 is a schematic representation of a business-to-business use model according to an example.

Further examples of embodiments of the present invention are shown and described, by way of example, in the accompanying drawings.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

In examples described herein a method is provided for controlling an energy terminal such as an EV. In certain cases, an energy terminal is connected to a charging infrastructure. Connecting to the charging infrastructure allows an energy resource to be distributed to the energy terminal. For example, in the case where the charging infrastructure is a power infrastructure, such as a national power grid, the energy terminals may be connected to the power infrastructure via power charging points.

According to an example an energy terminal is controlled by a controller. The controller may be located in the charging infrastructure, in the energy terminal, or distributed across the energy terminal and charging infrastructure. In another example the controller interacts with the energy terminal over a separate infrastructure such as a computer-based network. A third party may provide a controller in the form of software running on a centralized server or the energy terminal.

Control data is generated and used by the controller to control the re-distribution of an energy resource between the charging infrastructure and the energy terminal. In the example of an EV charging in a power grid, the control data may comprise data which instructs the charging infrastructure to enable the flow of electricity between a charging point and an EV. In some cases, the control data comprises data to control the interaction of the energy terminal with the charging infrastructure over a specified time period.

According to examples described herein, a controller provided in the energy terminal or charging infrastructure is used to generate control data based on a metric. The metric indicates a future availability of an energy resource at an energy terminal based on usage data associated to use of the energy resource by the energy terminal.

The methods and systems described herein may be used to establish an amount of an energy resource being consumed by an energy terminal and control the amount of the energy resource that is redistributed back to the charging infrastructure. This is achieved by the controller generating suitable control data from a metric that is determined on the basis of the usage data associated to the charging terminal. Control data allows an energy terminal to participate in energy balancing and trading mechanisms without compromising the usability of the energy terminal.

In particular certain examples of the methods and systems described herein provide an improved means of controlling the energy terminal for participation in such schemes. The methods and systems ensure that the amount of the energy resource stored in the energy terminal is appropriate for that energy terminal depending on the amount of usage and user preferences. In particular the methods and system improve the usability of the energy terminal and also improves the energy balancing and trading mechanisms when used in conjunction with the control data, energy terminals and charging infrastructure described herein.

Examples in the present disclosure can be provided as methods, systems or machine-readable instructions. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

Figure 4:
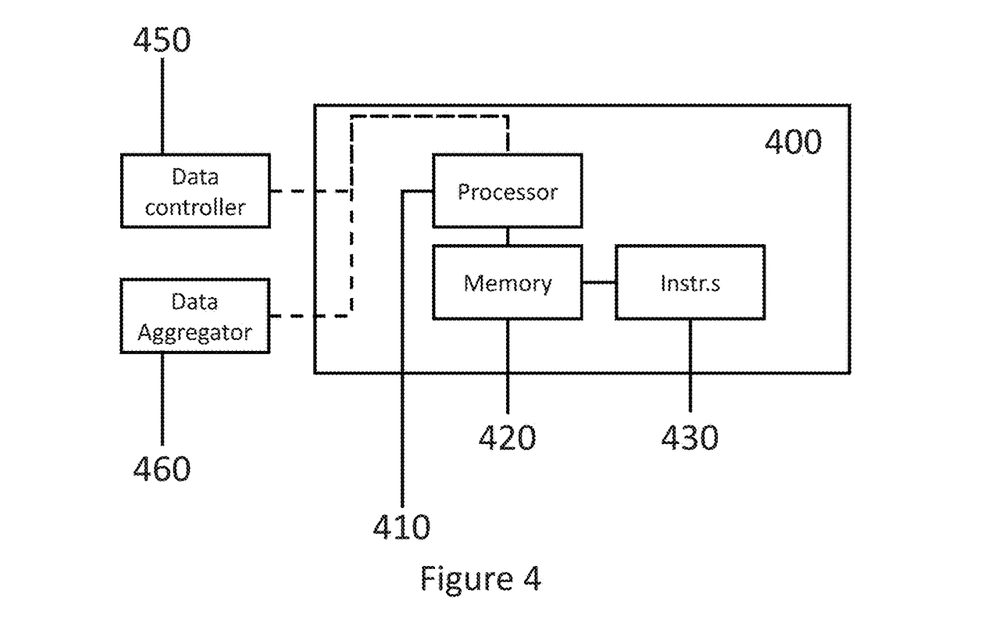
FIG. 4 is an example of a processor associated with a memory forming part of an EV according to an example.

For example, the instructions may be provided on a non-transitory computer readable storage medium encoded with instructions, executable by a processor. FIG. 4 shows an example of a processor 410 associated with a memory 420 forming part of an EV 400 according to an example. The memory 420 comprises computer readable instructions 430 which are executable by the processor 410. The processor 410 can be communicatively coupled to a data controller 450 and/or a data aggregator 460.

The instructions 430 may comprise:

instructions to communicate data indicative of the usage of an energy resource by an energy terminal; instructions to receive control data to control the distribution of the energy resource between the energy terminal and a charging infrastructure; and instructions to distribute the energy resource according to the control data, wherein the control data is determined on the basis of the future availability of the energy resource at the energy terminal based on the data indicative of the usage of the energy resource by the energy terminal.

Such machine-readable instructions may also be loaded onto a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in the block diagrams.

Figure 5:
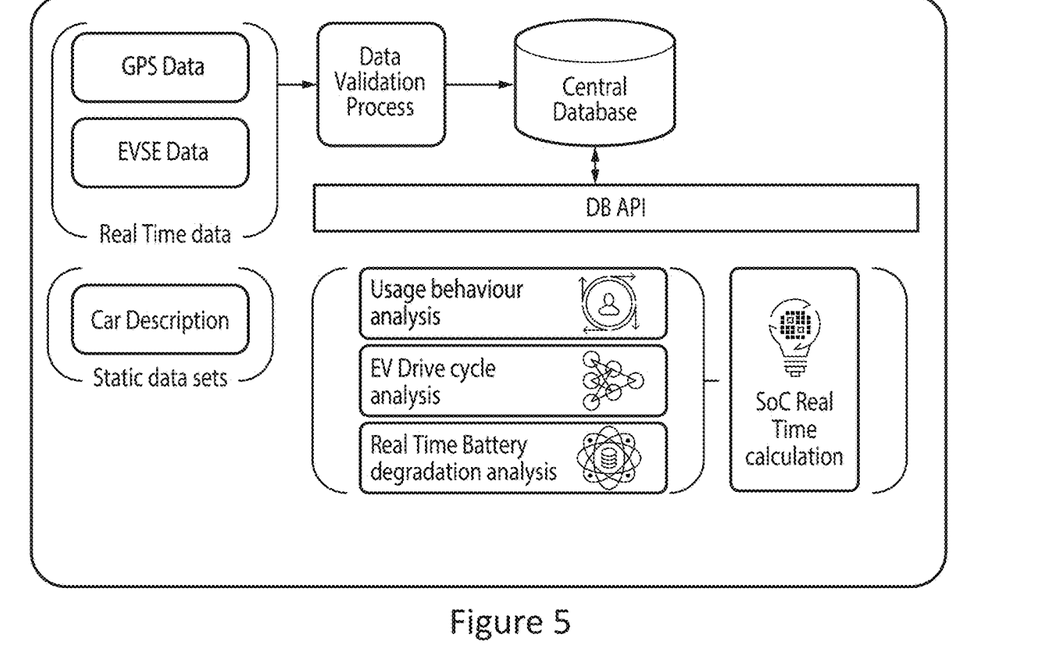
FIG. 5 is a schematic representation of state of charge module according to an example.

FIG. 5 is a schematic representation of state of charge module according to an example.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The invention claimed is:

1. A method for controlling an energy terminal, comprising:
   determining a metric indicating a future availability of an energy resource at an energy terminal based on usage data associated to use of the energy resource by the energy terminal;
   generating control data to control the distribution of the energy resource between the energy terminal and an energy infrastructure based on the metric; and communicating the control data to the energy terminal, wherein determining the metric of future availability of the energy terminal comprises:
  receiving geolocation data from a user device associated with a user of an energy terminal;
  determining, based on the geolocation data, a distance of the user from the energy terminal; and
  determining a time period of availability of the energy terminal based on the distance of the user from the energy terminal.

2. The method according to claim 1 comprising:
comparing the usage data to one more threshold values associated to the energy resource; and
determining the metric of future availability on the basis of the comparison with the threshold value.

3. The method according to claim 2 wherein the threshold value is a threshold for participation in an energy trading and/or balancing mechanism.

4. The method according to claim 1 wherein determining the metric of future availability comprises determining a probability of a likelihood that the energy terminal is connected to the energy infrastructure to enable redistribution of the energy resource.

5. The method according to claim 1 wherein the usage data comprises one or more of geolocation data, availability data, data associated to one or more users of the energy terminal, charging performance data, personal activity data from a user device and/or the energy terminal and metering data.

6. The method according to claim 1 wherein the control data comprises data specifying one or more of:
  an amount of and/or time period the energy resource is re-distributed to or from the charging infrastructure; and/or
  a time period when the energy terminal does not re-distribute the energy resource to or from the energy infrastructure.

7. The method according to claim 1 comprising:
updating the metric based on the further usage data associated to use of the energy resource by the energy terminal;
regenerating the control data based on the updated metric; and
communicating the control data to the energy terminal.

8. The method according to claim 1 comprising:
receiving an instruction to enable or prevent the energy terminal from distributing the energy resource between the energy terminal and the energy infrastructure; and
generating the control data on the basis of the instruction.

9. The method according to claim 1 comprising receiving usage data from one or more devices associated to a user of the energy terminal.

10. The method according to claim 9 comprising:
polling the one or more devices for usage data associated to the usage of the energy resource by the energy terminal.

11. The method, as claimed in claim 1, further comprising:
  generating a measure of battery degradation by determining an initial state of charge of a battery; and
  refining the initial state of charge by weighting the initial state of charge against a battery degradation model.

12. A non-transitory machine-readable storage medium encoded with instructions executable by a processor for controlling an energy terminal, the machine-readable storage medium comprising:
  instructions to communicate data indicative of the usage of the energy resource by an energy terminal;
  receive control data to control the distribution of the energy resource between the energy terminal and a charging infrastructure;
  distribute the energy resource according to the control data,
  receive geolocation data from a user device associated with a user of an energy terminal;
  determine, based on the geolocation data, a distance of the user from the energy terminal; and
  determine a time period of availability of the energy terminal based on the distance of the user from the energy terminal,
  wherein the control data is determined on the basis of the future availability of the energy resource at the energy terminal based on the data indicative of the usage of the energy resource by the energy terminal.

13. A non-transitory machine-readable storage medium as claimed in claim 12, further comprising instructions to:
  generate a measure of battery degradation by determining an initial state of charge of a battery; and
  refine the initial state of charge by weighting the initial state of charge against a battery degradation model.

14. An apparatus comprising:
data aggregator arranged to:
receive usage data associated to an energy resource by one or more energy terminals; and
determine a metric indicating a future availability of an energy resource at the plurality of energy terminals; and
a data controller arranged to:
  generate control data to control the distribution of the energy resource between the plurality of energy terminals and an energy infrastructure based on the metric communicate the control data to the plurality of energy terminals, wherein, to determine the metric indicating a future availability of an energy resource, the data aggregator is arranged to:
  receive geolocation data from a user device associated with a user of an energy terminal;
  determine, based on the geolocation data, a distance of the user from the energy terminal; and
  determine a time period of availability of the energy terminal based on the distance of the user from the energy terminal.

15. The apparatus of claim 14, wherein the data aggregator is arranged to:
  compare the usage data to one or more threshold values associated to the energy resource; and
  determine the metric of future availability on the basis of the comparison with the threshold value.

16. The apparatus of claim 14, wherein the data aggregator is arranged to update the metric based on the further usage data associated to use of the energy resource by the plurality of energy terminals.

17. The apparatus of claim 16, wherein the data controller is arranged to regenerate the control data based on the updated metric and communicate the control data to the plurality of energy terminals.

18. The apparatus of claim 14, wherein the data controller is arranged to generate the control data on the basis of an instruction received by the apparatus, the instruction to enable or prevent the plurality of energy terminals from distributing the energy resource between the plurality of energy terminals and the energy infrastructure.

* * * * *